United States Patent
Horton et al.

(10) Patent No.: US 10,239,186 B2
(45) Date of Patent: Mar. 26, 2019

(54) SYSTEM FOR INTERNAL AIR BLASTING OF AN ENCLOSED SPACE WITH AN AUTOMATED APPARATUS

(71) Applicant: WHEELABRATOR GROUP, INC., Golden, CO (US)

(72) Inventors: Shawn Horton, Woodstock (CA); Jesse Erle, Hamilton (CA)

(73) Assignee: WHEELABRATOR GROUP, INC., Golden, CO (US)

( * ) Notice: Subject to any disclaimer, the term of this patent is extended or adjusted under 35 U.S.C. 154(b) by 175 days.

(21) Appl. No.: 15/379,939

(22) Filed: Dec. 15, 2016

(65) Prior Publication Data

US 2018/0169833 A1 Jun. 21, 2018

(51) Int. Cl.

| | |
|---|---|
| *B24C 3/06* | (2006.01) |
| *B24C 3/32* | (2006.01) |
| *B08B 5/02* | (2006.01) |
| *B08B 9/093* | (2006.01) |
| *B25J 11/00* | (2006.01) |
| *A47L 1/00* | (2006.01) |
| *B25J 5/00* | (2006.01) |

(52) U.S. Cl.
CPC .............. *B24C 3/067* (2013.01); *A47L 1/00* (2013.01); *B08B 5/02* (2013.01); *B08B 9/093* (2013.01); *B24C 3/06* (2013.01); *B24C 3/065* (2013.01); *B24C 3/325* (2013.01); *B25J 5/007* (2013.01); *B25J 11/0085* (2013.01)

(58) Field of Classification Search
CPC ........... B24C 3/06; B24C 3/062; B24C 3/065; B24C 3/067; B24C 7/00; B24C 7/0046
See application file for complete search history.

(56) References Cited

U.S. PATENT DOCUMENTS

| | | | | |
|---|---|---|---|---|
| 4,035,958 | A * | 7/1977 | Nishio | B24C 3/06 451/88 |
| 4,064,656 | A * | 12/1977 | Zeidler | B24C 3/04 239/165 |
| 4,255,906 | A * | 3/1981 | Hockett | B24C 3/06 239/255 |
| 4,545,156 | A * | 10/1985 | Hockett | B24C 3/06 118/323 |
| 4,785,760 | A * | 11/1988 | Tholome | B05B 5/1625 118/323 |
| 4,905,426 | A * | 3/1990 | Robinson | B24C 3/06 239/255 |
| 4,937,759 | A * | 6/1990 | Vold | B25J 9/1602 700/262 |
| 5,155,423 | A * | 10/1992 | Karlen | B25J 9/04 318/568.1 |
| 5,339,573 | A * | 8/1994 | Uchida | B23K 31/12 451/75 |
| 5,358,568 | A * | 10/1994 | Okano | B05B 13/005 118/323 |

(Continued)

*Primary Examiner* — Timothy V Eley
(74) *Attorney, Agent, or Firm* — Lando & Anastasi, LLP (57) ABSTRACT

A system for internal air blasting of an enclosed space includes a ground vehicle, an arm supported by the ground vehicle, and a blasting nozzle provided at the end of the arm. The blasting nozzle being configured to direct blast media to a desired surface of the enclosed space to be treated by the arm. A method of internal air blasting an enclosed space is further disclosed.

6 Claims, 5 Drawing Sheets

(56) References Cited

U.S. PATENT DOCUMENTS

| | | | | |
|---|---|---|---|---|
| 5,433,653 | A * | 7/1995 | Friess | B24C 1/003 |
| | | | | 451/100 |
| 5,545,074 | A * | 8/1996 | Jacobs | B24C 3/065 |
| | | | | 451/102 |
| 5,737,500 | A * | 4/1998 | Seraji | B25J 9/1643 |
| | | | | 318/568.11 |
| 5,781,705 | A * | 7/1998 | Endo | B25J 9/1643 |
| | | | | 318/568.22 |
| 6,004,190 | A * | 12/1999 | Trampusch | B24C 1/003 |
| | | | | 451/38 |
| 6,390,898 | B1 * | 5/2002 | Pieper | B08B 3/024 |
| | | | | 451/100 |
| 6,656,014 | B2 * | 12/2003 | Aulson | B24C 1/045 |
| | | | | 451/2 |
| 6,749,490 | B1 * | 6/2004 | Hafenrichter | B24C 1/045 |
| | | | | 451/2 |
| 8,939,106 | B2 * | 1/2015 | Takahashi | B05B 16/40 |
| | | | | 118/323 |
| 9,555,546 | B2 * | 1/2017 | Hamm | B25J 9/1643 |
| 2003/0064668 | A1 * | 4/2003 | Mrak | B24C 3/065 |
| | | | | 451/88 |
| 2014/0273752 | A1 * | 9/2014 | Bajaj | B24B 53/017 |
| | | | | 451/6 |

* cited by examiner

SYSTEM FOR INTERNAL AIR BLASTING OF AN ENCLOSED SPACE WITH AN AUTOMATED APPARATUS

BACKGROUND OF THE DISCLOSURE

1. Field of the Disclosure

The present disclosure is generally directed to preparing surfaces, and more particularly to treating surfaces of an enclosed vessel with media blast material.

2. Discussion of Related Art

Existing methods for internal blasting of a tank railcar include having an operator enter an interior of the railcar through a topside 20" diameter hatch. The operator or operators erect scaffolding and/or bring ladders with them into the interior of the railcar to enable blasting of internal surfaces of the tank railcar. Lighting must also be setup inside the railcar. Further complicating the process, the operator carries blasting hoses and breathing air supply lines into the railcar. Another operator remains outside to support the operator performing a blasting operation inside the confined space of the tank railcar. Ventilation of dust is also required for the confined space. As with the other equipment and materials, all supply hoses and ventilation ducting access the interior of the railcar through the single 20" diameter hatch.

During a blast operation, the means of egress from the railcar can be obstructed, as the hatch is congested with hoses and ventilation equipment. Airflow for ventilation of dust-laden air is not optimal so the environment becomes difficult to see within the interior of the railcar. The work requires prolonged physical exertion in non-ergonomic positions and a harsh environment.

Figure 1:
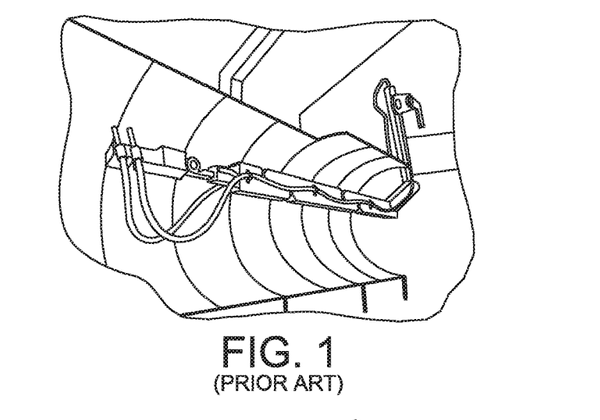
FIG. 1 is a perspective view of a prior art robotic arm having two blasting nozzles configured to direct blast media toward a desired surface.
Figure 2:
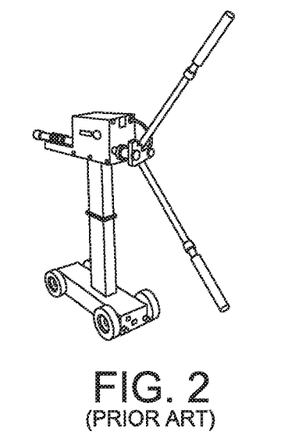
FIG. 2 is a perspective view of another prior art robotic apparatus having several blasting nozzles configured to direct blast media toward a desired surface.
Figure 3:
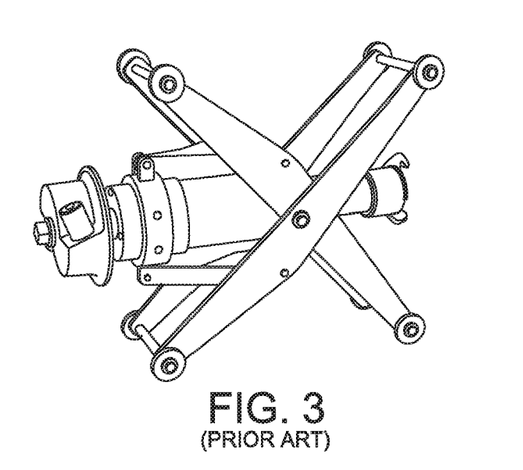
FIG. 3 is a perspective view of yet another prior art media blast machine.

There are several potential automated solutions to the problems associated with manually treating the interior surfaces of an enclosed vessel with blast media. One known solution is illustrated in FIG. 1, which shows a robotic arm that extends through the opening of the railcar. As shown, the robotic arm has two nozzles configured to direct blast media toward the interior surfaces of the railcar. Another known solution is illustrated in FIG. 2, which shows a Robotica™ robotic apparatus offered for sale by Sponge-Jet, Inc. of Newington, N.H. As shown, the robotic apparatus has four wheels configured to travel along the floor of the railcar. The robotic apparatus further includes several nozzles configured to direct blast media toward the interior surfaces of the railcar. Yet another known solution is illustrated in FIG. 3, which shows a Spin Blast media blast machine offered for sale by Clemco Industries Corp. of Washington, Mo. As shown, the media blast machine is designed to operate within small spaces, such as large diameter pipes.

A safer, automated method is desired to minimize the requirement for people to enter the confined space and to remove any contaminants for an operator inside the enclosed space during the blasting operation.

SUMMARY OF THE DISCLOSURE

One aspect of the present disclosure is directed to a system for internal air blasting of an enclosed space. In one embodiment, the system includes a ground vehicle, an arm supported by the ground vehicle, and a blasting nozzle provided at the end of the arm. The blasting nozzle being configured to direct blast media to a desired surface of the enclosed space to be treated by the arm.

Embodiments of the system further may include the ground vehicle having a chassis and four wheels coupled to the chassis. The system further may include a power and control line to provide power and control to the ground vehicle and the arm, a blasting hose fluidly coupled to the blasting nozzle and a source of blast media, and a 3D scanner coupled to the blasting nozzle to enable an operator to scan the surface requiring treatment. The ground vehicle further may include vacuum heads coupled to a vacuum hose to remove debris from a floor of the enclosed space. The arm may include a plurality of articulated segments that can move the blasting nozzle provided at the end of the arm. The plurality of articulated segments of the arm may be configured to achieve a desired position, including a front blast position, a ground blast position, and a side wall blast position. The system further may include a controller to control the operation of the ground vehicle and the arm.

Another aspect of the disclosure is directed to a method of internal air blasting of an enclosed space. In one embodiment, the method includes: lowering individual components of a system into an enclosed space; assembling components of the system within the enclosed space, including mounting wheels to a ground vehicle, mounting an arm on the ground vehicle, and attaching a blasting nozzle on the arm; and initiating a blasting operation on interior surfaces of the enclosed space in which blast media is selectively directed by the blasting nozzle to the interior surfaces.

Embodiments of the method further may include moving the ground vehicle to one end of the enclosed space, with the blasting nozzle being directed to a floor of the enclosed space, then to walls and a roof of the enclosed space. While the blasting nozzle is blasting blast media, at least one vacuum head provided at an end of the ground vehicle may reclaim spent blast media that has accumulated at the floor of the enclosed space. The ground vehicle may be relocated to a new position towards a center of the enclosed space, with the blasting nozzle being directed sequentially to the floor, walls, and the roof of the enclosed space. The ground vehicle may be relocated again until the ground vehicle reaches a center of the enclosed space, at which point the ground vehicle re-orients and moves to the other end of the enclosed space. The further may include a vacuum reclaim operation to vacuum expelled blast media. The vacuum reclaim operation may include operating at least one vacuum head of the ground vehicle to reclaim expelled blast media that has accumulated on a floor of the enclosed space. The vacuum reclaim operation further may include moving the ground vehicle to one end of the railcar, and moving the arm in an oscillating motion back and forth across the floor of the enclosed space. The ground vehicle may be positioned at a center of the enclosed space, and the ground vehicle may be moved to the other end of the railcar and begins a vacuuming process. The method further may include disassembling the components of the system, and removing the components of the system from the enclosed space.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

Periodically, a tank railcar requires air blasting of inside surfaces of the railcar for both removal of existing coatings and/or preparation for new coatings. Currently, railcar manufacturers and re-furbishers are required to send operators inside a confined space of a vessel (the tank railcar), which has only one means of access and egress—a 20" diameter hatch at a top, center of the railcar. Embodiments of the present disclosure are directed to an automated blasting and abrasive removal process to minimize the need for personnel to enter the confined space (railcar) during the blasting operation. Blasting (cleaning) of the inside of tank railcars is currently done manually, using air blast technology. Presently, there is no automated, mobile blast system for internal blasting of this type of railcar. There is only one 4" diameter port on a bottom of the railcar available for abrasive removal, which means that vacuum recovery of spent abrasive is the only practical means of recovery.

The phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 4:
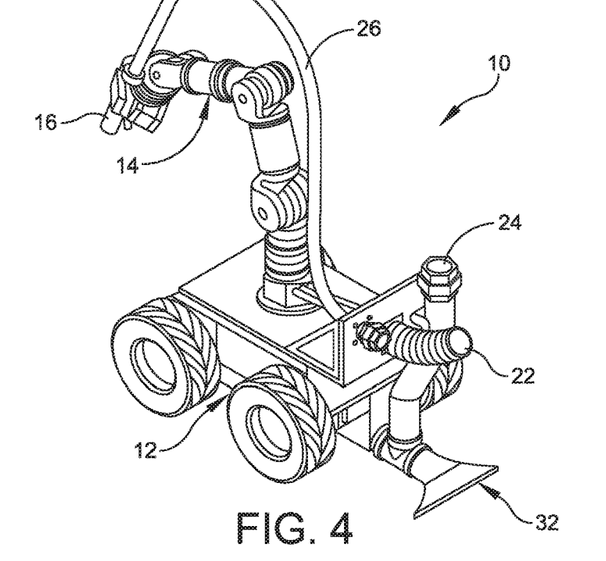
FIG. 4 is a perspective view of a system of an embodiment of the present disclosure that is used to direct blast media to a surface of an enclosed space.

Referring to the drawings, and more particularly to FIG. 4, a system configured to perform an internal blasting operation within an enclosed space of a vessel with an automated blast apparatus is generally indicated at 10. In particular, the system 10 is configured to automatically blast abrasive blast media inside an enclosed vessel, such as a tank railcar, with the ability to reach all of the interior surfaces of the vessel, and to remove the spent blast media. The system 10 provides an automated process to remove the need for operators to manually perform blasting and abrasive cleanup operations inside the vessel. In certain embodiments, which will be discussed in greater detail below, the system 10 includes robotic equipment, hose management assemblies, an operator control room, platform and lifting equipment, tank car vacuum reclaim equipment, ventilation hose and cover, blasting hoses and blasting nozzles. This system 10 can be used with existing abrasive storage, reclaim, blast tanks, and dust collectors.

Figure 5:
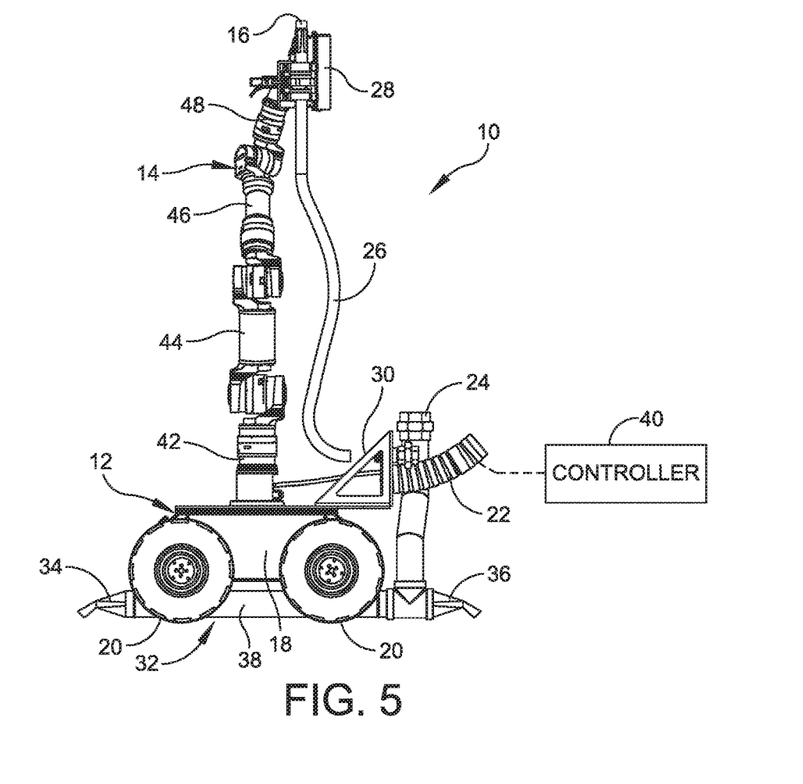
FIG. 5 is a side elevational view of the system.
Figure 6:
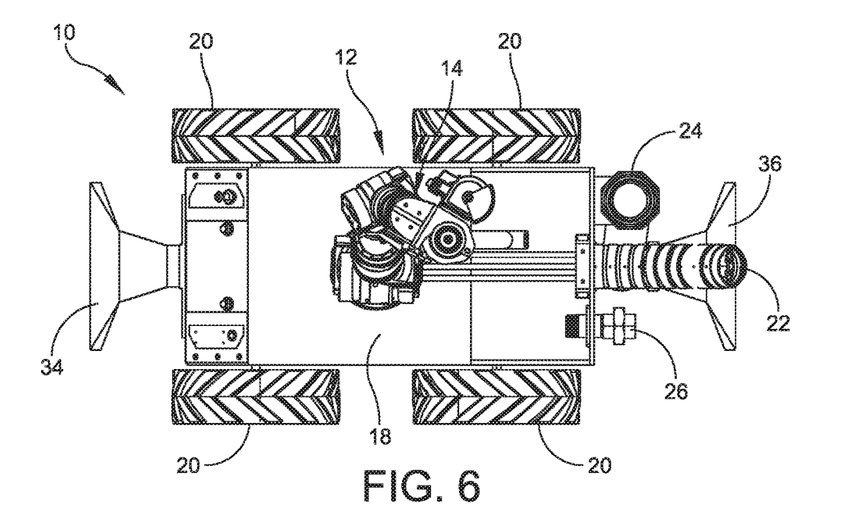
FIG. 6 is a top plan view of the system.
Figure 7:
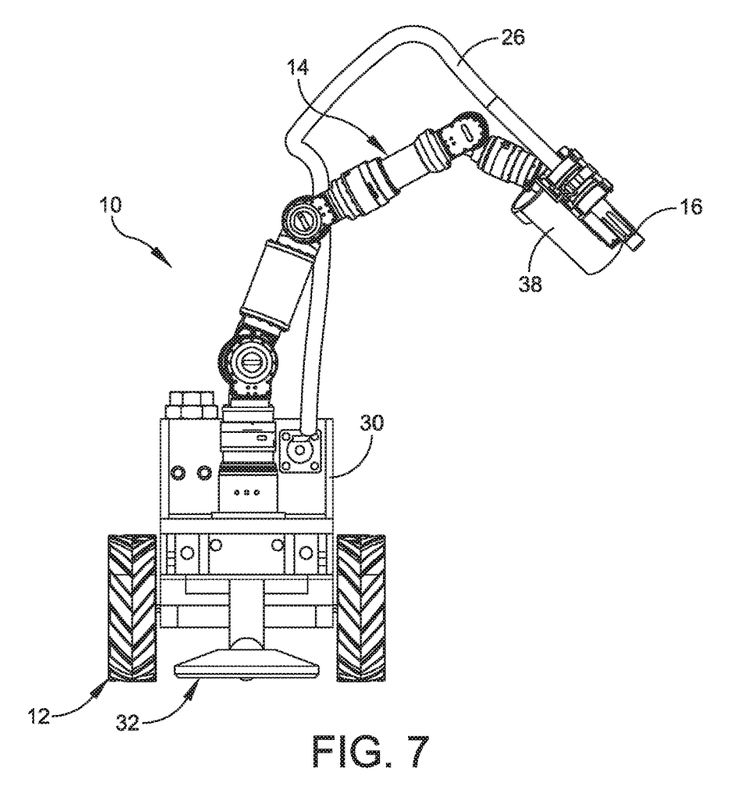
FIG. 7 is a rear elevational view of the system.

Referring additionally to FIGS. 5-7, the system 10 includes a robotic ground vehicle, generally indicated at 12, a robotic arm, generally indicated at 14, which is supported by the robotic ground vehicle, and a blasting nozzle, generally, indicated at 16, provided at the end of the robotic arm. As shown, the robotic ground vehicle 12 includes a chassis 18 configured to support the components of the system 10, and four wheels, each indicated at 20, coupled to the chassis to enable the chassis to roll along a surface of the vessel. The system 10 further includes a power and control line 22, a vacuum hose 24, a blasting hose 26, and a 3D scanner 28, the purpose of which will be described in greater detail as the description of the system proceeds. The chassis 18 includes a frame structure 30 that is configured to support the power and control line 22, the vacuum hose 24 and an end of the blasting hose 26.

As best shown in FIGS. 5 and 6, the system 10 further includes a vacuum system, generally indicated at 32, which is designed to remove debris from a bottom or floor of the vessel. Specifically, the chassis 18 of the robotic ground vehicle 12 further is configured to support two vacuum heads 34, 36, which are fluidly coupled to the vacuum hose 24 to remove debris from the bottom of the vessel. As shown, a first vacuum head 34 is secured to and positioned at a front of the chassis 18 and a second vacuum head 36 is secured to and positioned at an opposite end of the chassis. The vacuum heads 34, 36 are connected to one another by a large conduit 38 that extends axially along a length of and underneath the chassis 18. Each vacuum head 34, 36 embodies a relatively large structure that spans nearly the entire width of the chassis 18 and is positioned proximate to the bottom of the vessel to maximize a vacuuming effect of the vacuum system 32. The second vacuum head 36 is connected to the vacuum hose 24, which in turn is connected to another vacuum hose (not shown) to exhaust debris from the interior of the vessel through a hatch of the vessel. Suitable couplings may be provided to secure the vacuum hoses to one another.

In some embodiments, the system 10 includes a controller 40 (FIG. 5) to control the operation of the components of the system, including the robotic ground vehicle 12, the robotic arm 14 and the vacuum system 32. In one embodiment, the controller 40 is provided in the operator control room and is connected to the robotic ground vehicle 12 by means of the power and control line 22. In another embodiment, the controller 40 may be provided on the robotic ground vehicle 12, and operated by a remote control provided to the operator. The controller 40 includes a microcomputer connected to all of the electronic components of the system, effectors (e.g., motors, pump, lights, alarms, etc.), rechargeable batteries, and sensors (e.g., infrared, motor encoders, battery status sensors, etc.).

In one embodiment, the robotic ground vehicle 12 includes a motor to drive the rotation of a wheel or wheels 20 to move the robotic ground vehicle in the traditional manner. The motor and an associate drive module are housed within the chassis 18 of the robotic ground vehicle 12. In a certain embodiment, a drive module is provided to drive the rotation of the wheels 20 of the robotic ground vehicle 12. The drive module may include two drive motors, two axles, and two power transmission belts or chains in which the motors drive the rotation of the front wheels 20, with the transmission belt or chain driving the rotation of the rear wheels 20. The motors and the axles may be suitably secured to the chassis 18 of the robotic ground vehicle 12 in the traditional manner.

As shown, the robotic arm 14 includes a plurality of articulated segments that can move the blasting nozzle 16, which is attached to the robotic arm at the end of the robotic arm, in a desired direction. In one embodiment, the robotic arm 14 includes a base segment 42, which is removably connected to the chassis 18 of the robotic ground vehicle 12 in a suitable manner. For example, the base segment 42 may be connected to the chassis 18 by a bayonet-type connector. The base segment 42 is rotatably connected to a first articulating segment 44, which in turn is rotatably connected to a second articulating segment 46, which in turn is rotatably connected to a third articulating segment 48. The blasting nozzle 16 is secured to the third articulating segment 48 at the end of the third articulating segment. The arrangement is such that the robotic arm 14, under the control of the controller 40, can be articulated to position the blasting nozzle 16 in a desired direction to perform a blast or cleaning apparatus.

Figure 8:
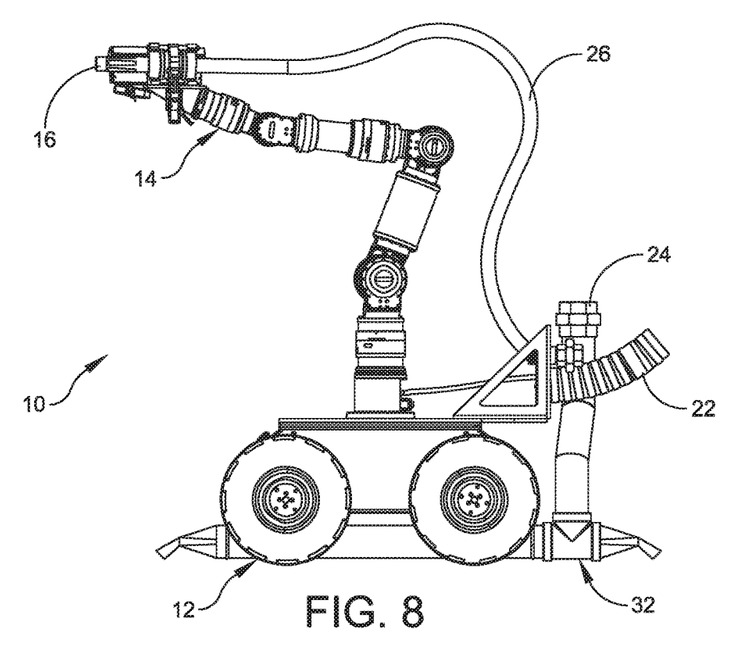
FIG. 8 is a side elevational view of the system with the arm in a front blast position.
Figure 9:
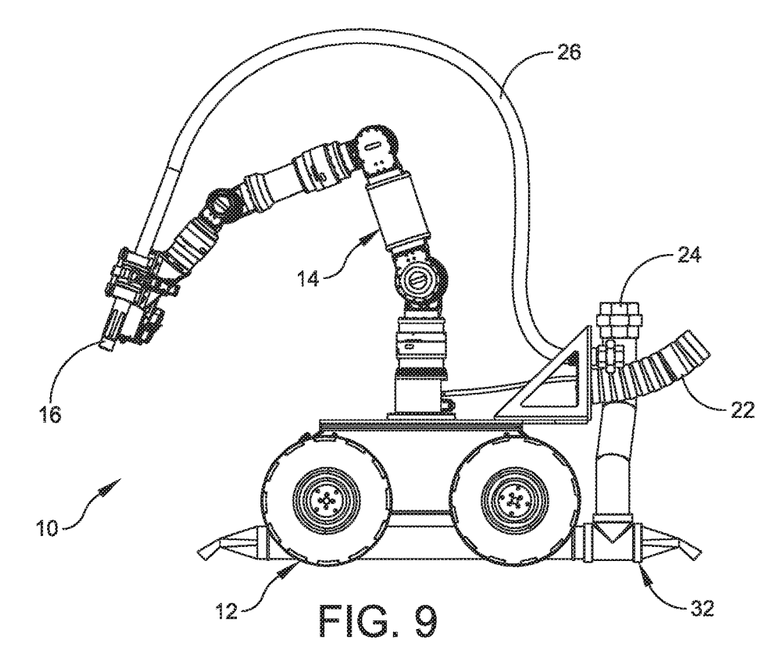
FIG. 9 is a side elevational view of the system with the arm in a ground blast position.
Figure 10:
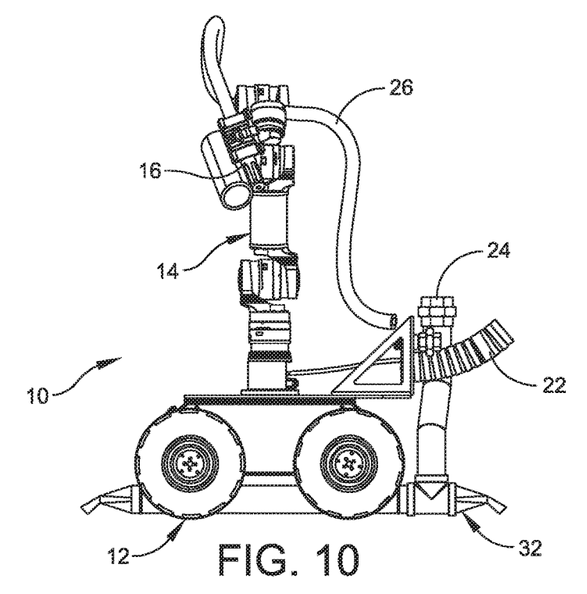
FIG. 10 is a side elevational view of the system with the arm in a side wall blast position.

For example, FIG. 8 illustrates the robotic arm 14, which along with the robotic ground vehicle 12 may be referred to as an automated apparatus, in a front blast position in which the blasting nozzle 16 of the robotic arm is directed to a surface of the vessel in front of the robotic ground vehicle. FIG. 9 illustrates the robotic arm 14 in a ground blast position in which the blasting nozzle 16 of the robotic arm is directed to a floor or ground surface of the vessel. FIG. 10 illustrates the robotic arm 14 in a side wall blast position in which the blasting nozzle 16 of the robotic arm is directed to a surface of the vessel to a side of the robotic ground vehicle.

In the shown embodiment, the power and control line 22 and the vacuum hose 24 are secured to the chassis 18 of the robotic ground vehicle 12. The blasting hose 26 is fluidly connected to the blasting nozzle 16. The 3D scanner 28 is secured to the blasting nozzle 16 to enable the operator to scan the surface requiring treatment. In one embodiment, the 3D scanner 28 is a 3D infrared class 1 laser sensor that enables scanning during a blast operation.

Figure 11:
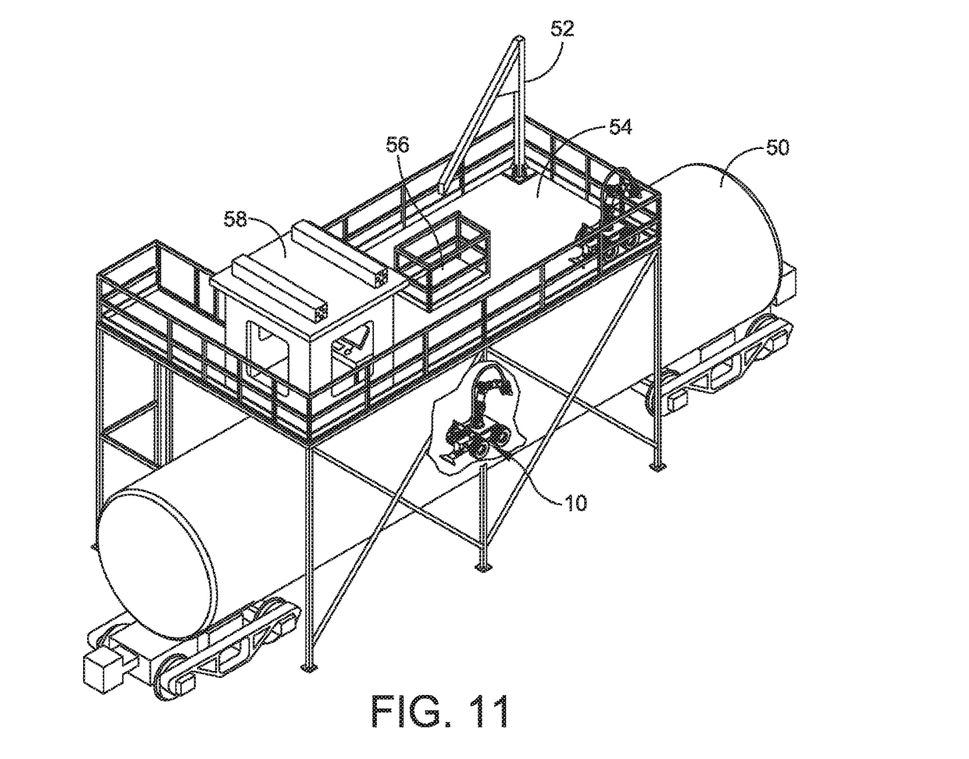
FIG. 11 is a perspective view of the system used to treat interior surfaces of a vessel, such as a tank railcar.

Referring to FIG. 11, the system 10 of embodiments of the present disclosure operates as follows during an operation to treat the interior surfaces of a railcar 50. In one embodiment, a jib crane 52, which can be mounted on a platform 54, is used to lower individual components of the system 10, e.g., the robotic ground vehicle 12, the robotic arm 14 and blasting nozzle 16, and the power and control line 22, vacuum hose 24 and the blasting hose 26, through a 20" diameter hatch 56 located on top, center of the railcar 50. As shown, the platform 54 is constructed to span a width of the railcar 50, and further includes an operator control room 58. The operator of the system 10 enters the hatch 56 of the railcar 50 by a ladder or some other sort of climbing apparatus.

Once in the railcar 50, the operator assembles the following components inside the railcar. The operator assembles wheels 20 to the chassis 18 of the unmanned robotic ground vehicle 12. Next, the operator assembles the robotic arm 14, which is equipped with the blasting nozzle 16 and the 3D scanner 28, to the chassis 18 of the robotic ground vehicle 12. The operator then attaches the power and control line 22, the vacuum hose 24 and the blasting hose 26 to the assembled components of the system 10. Other components of the system can be assembled as well.

Once the system 10 is fully assembled, the operator exits the railcar 50 through the hatch 56 and removes the ladder. Next, the operator places a flexible ventilation duct and shroud over the railcar hatch 56, and relocates to the operator control room 58 provided on the platform 54 to initiate and monitor a blasting sequence. The blasting sequence may include, for example, the following steps. The robotic ground vehicle 12 of the system 10 travels to one end of the railcar 50, and with the blasting nozzle 16, blasts the floor of the railcar and an end plate first, prior to blasting the walls and roof areas of the railcar. While the blasting nozzle 16 of the system 10 is blasting, the two vacuum heads 34, 36 of the vacuum system 32 provided at both ends of the chassis 18 of the robotic ground vehicle 12 are simultaneously reclaiming spent abrasive (blast media) that has accumulated at the floor of the railcar 50.

The robotic ground vehicle 12 then relocates to a new position towards the center of the railcar 50 and blasts the floor, walls, and roof interior surfaces of the railcar. This step is repeated until the robotic ground vehicle 12 reaches the center of the railcar 50, at which point the robotic ground vehicle re-orients and moves to the other end of the rail car. The other end of the railcar 50 is blasted using the same sequence as described above until the robotic ground vehicle 12 is once again at the center of the railcar, at which point the blasting cycle is complete.

The operator manually changes the hose connections to move from blasting mode to a final vacuum reclaim mode. The operator returns to the control room 58 to initiate and monitor the abrasive vacuum reclaim sequence. In one embodiment, this sequence includes moving the robotic ground vehicle 12 of the system 10 to one end of the railcar 50. The robotic arm 14 of the system 10 begins executing an oscillating motion back and forth across the bottom of the railcar 50. Abrasive spent blast media is vacuumed through a vacuum nozzle provided on the end of the robotic arm 14. Next, the operator uses a robot-mounted camera, which may embody a separate camera mounted on the robotic ground vehicle 12, to monitor the vacuum process, and manually moves the robotic ground vehicle back to towards the center of the railcar 50 as the floor is cleaned.

When the robotic ground vehicle 12 is positioned at the center of the railcar 50, the robotic ground vehicle moves to the other end of the railcar and begins the same vacuuming process as described above until the robotic ground vehicle is once again at the center of the railcar. After the dust-laden air has been ventilated, the operator enters the railcar 50 to disassemble the robotic ground vehicle 12 and the robotic arm 14 of the system 10, the power and control line 22, vacuum hose 24 and the blasting hose 26. These components of the system 10 are lifted out of the railcar 50 with the platform-mounted jib crane 52, and stowed on the platform 54 for later use. The operator may then reenter the railcar 50 to perform a final inspection and cleanout.

It should be observed that the system of embodiments of the present disclosure uses lighter, less expensive components for automated blasting of tank railcar interiors. The system may be configured to use a single 7/16" diameter blasting nozzle that requires much less compressed air than the one (1) or two (2) ¾" diameter nozzles used in prior blasting nozzles. The system includes additional functionality of being able to reclaim spent abrasive from inside the railcar. Additionally, the system may be configured to require only 25' from floor level to fit the system into an existing facility compared to a large support structure above the railcar, so the system can be hung in a straight and vertical orientation when not in position inside the railcar. The system further enables specific targeting of all railcar internal surfaces. For example, the blasting nozzle angle can be oriented perpendicular to end caps of the railcar for optimal blasting efficiency.

The system of embodiments of the present disclosure can be used for internal blast and reclaim of abrasive from different styles of railcar, as long they have a minimum hatch size of 20" diameter. The system can be useful in other air blast applications, including in an operator control room equipped with similar robotic and hose management components could be used to replace human blasters, and to blast the inside of wind towers. The blasting and abrasive reclaim operation may be performed by a robotic system instead of by humans, which provides the following benefits. Operators are not located inside an enclosed space during blasting operations, thereby eliminating injuries from blasting nozzles, repetitive strain, airborne dust and contaminants. Dangers associated with setting up and working from scaffolding and/or ladders are eliminated. Means of egress from the railcar, through the top hatch, is now less impeded by a number of hoses, lines, and ventilation duct. Cycle time is improved.

The robotic system works continuously, and does not need time for setup and repositioning of ladders or scaffolding to access all areas of the tank railcar. The robotic system is more efficient as there is no time lost for breaks or absenteeism. The system reduces labor requirements. Since the robotic system is more efficient, the system can replace multiple human blasters. Since the operator now spends most of his/her time outside of the railcar, there is usually no requirement for a support person to remain outside the railcar while the operator is working inside the confined space (railcar). Thus, job quality for the operator(s) is improved.

The physically demanding process of blasting inside a railcar is eliminated by the robotic system while the operator monitors the process from the comfort of the control room. The operator is now a more skilled individual as he will be operating and setting up automated robotic equipment.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A system for internal air blasting of an enclosed space, the system comprising:
   a ground vehicle;
   an arm supported by the ground vehicle;
   a blasting nozzle provided at an end of the arm, the blasting nozzle being configured to direct blast media to a desired surface of an enclosed space to be treated by the arm; and
   a 3D scanner coupled to the blasting nozzle to enable an operator to scan a surface requiring treatment, the 3D scanner being positioned adjacent the blasting nozzle to extend along an axis parallel to an axis of the blasting nozzle.

2. A system for internal air blasting of an enclosed space, the system comprising:
   a ground vehicle including a chassis and four wheels coupled to the chassis;
   an arm supported by the ground vehicle;
   a blasting nozzle provided at an end of the arm, the blasting nozzle being configured to direct blast media to a desired surface of the enclosed space to be treated by the blasting nozzle,
   wherein the arm includes a plurality of articulated segments that can move the blasting nozzle provided at the end of the arm, the arm including a base segment removably connected to the chassis of the ground vehicle, a first articulating segment rotatably connected to the base segment, a second articulating segment rotatably connected to the first articulating segment, and a third articulating segment rotatably connected to the second articulating segment, the blasting nozzle being secured to the third articulating segment at an end of the third articulating segment, and
   wherein the plurality of articulated segments of the arm is configured to achieve a desired position, including a front blast position in which the blasting nozzle is directed to a surface of the enclosed space in front of the ground vehicle, a ground blast position in which the blasting nozzle is directed to a ground surface of the enclosed space, and a side wall blast position in which the blasting nozzle is directed to a surface of the enclosed space to a side of the ground vehicle; and
   a 3D scanner coupled to the blasting nozzle to enable an operator to scan the surface requiring treatment, the 3D scanner being positioned adjacent the blasting nozzle to extend along an axis parallel to an axis of the blasting nozzle.

3. The system of claim 2, further comprising a power and control line to provide power and control to the ground vehicle and the arm.

4. The system of claim 2, further comprising a blasting hose fluidly coupled to the blasting nozzle and a source of blast media.

5. The system of claim 2, wherein the ground vehicle further includes vacuum heads coupled to a vacuum hose to remove debris from a floor of the enclosed space.

6. The system of claim 2, further comprising a controller to control the operation of the ground vehicle and the arm.

* * * * *